US011429647B2

(12) United States Patent
Hunt

(10) Patent No.: US 11,429,647 B2
(45) Date of Patent: Aug. 30, 2022

(54) DOMAIN SPECIFIC PREDICTIVE MODEL FOR ENTITY ASSESSMENT AND VALUATION

(71) Applicant: Douglas Hunt, Naples, FL (US)

(72) Inventor: Douglas Hunt, Naples, FL (US)

( * ) Notice: Subject to any disclaimer, the term of this patent is extended or adjusted under 35 U.S.C. 154(b) by 401 days.

(21) Appl. No.: 16/751,089

(22) Filed: Jan. 23, 2020

(65) Prior Publication Data

US 2020/0233886 A1 Jul. 23, 2020

Related U.S. Application Data

(60) Provisional application No. 62/795,904, filed on Jan. 23, 2019.

(51) Int. Cl.
| | |
|---|---|
| *G06F 16/18* | (2019.01) |
| *G06F 16/28* | (2019.01) |
| *G06F 16/2457* | (2019.01) |
| *G06N 7/00* | (2006.01) |
| *G06F 9/46* | (2006.01) |
| *G06F 16/2458* | (2019.01) |

(52) U.S. Cl.
CPC ............ *G06F 16/288* (2019.01); *G06F 9/466* (2013.01); *G06F 16/2458* (2019.01); *G06F 16/24573* (2019.01); *G06N 7/00* (2013.01)

(58) Field of Classification Search
CPC ............. G06F 16/288; G06F 16/24573; G06F 16/2458
See application file for complete search history.

(56) References Cited

U.S. PATENT DOCUMENTS

2013/0151388 A1* 6/2013 Falkenborg ............ G06Q 40/02
705/35
2014/0344185 A1* 11/2014 Murguia ................ G06Q 40/06
705/36 R

* cited by examiner

*Primary Examiner* — Loc Tran
(74) *Attorney, Agent, or Firm* — FisherBroyles, LLP

(57) ABSTRACT

Systems and methods are disclosed for domain specific predictive model for entity assessment and valuation. In one implementation, evaluation criteria are identified. Historical data is collected with respect to one or more entities. Based on the one or more evaluation criteria and the historical data, one or more scores are reverse engineered with respect to the one or more entities. Linear regression analysis is performed on the one or more scores to build a predictive model. Analyze a new entity using the same scoring system with pre-prescribed parameters. Using the predictive model, a valuation of an entity is computed. One or more aspects of the computed valuation are presented within an interactive interface using a sensitivity analysis approach.

12 Claims, 9 Drawing Sheets

Fig. 2

DOMAIN SPECIFIC PREDICTIVE MODEL FOR ENTITY ASSESSMENT AND VALUATION

CROSS-REFERENCE TO RELATED APPLICATION

This application is related to and claims the benefit of U.S. Patent Application No. 62/795,904, filed Jan. 23, 2019, which is incorporated herein by reference in its entirety.

TECHNICAL FIELD

Aspects and implementations of the present disclosure relate to data processing, and more specifically, to domain specific predictive model for entity assessment and valuation.

BACKGROUND

Existing techniques for assessing an entity often focus on a small number of factors such as financial criteria and anecdotal evidence.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 2-7 illustrate example content, visualizations, and interfaces, in accordance with various example embodiments.

DETAILED DESCRIPTION

Figure 1:
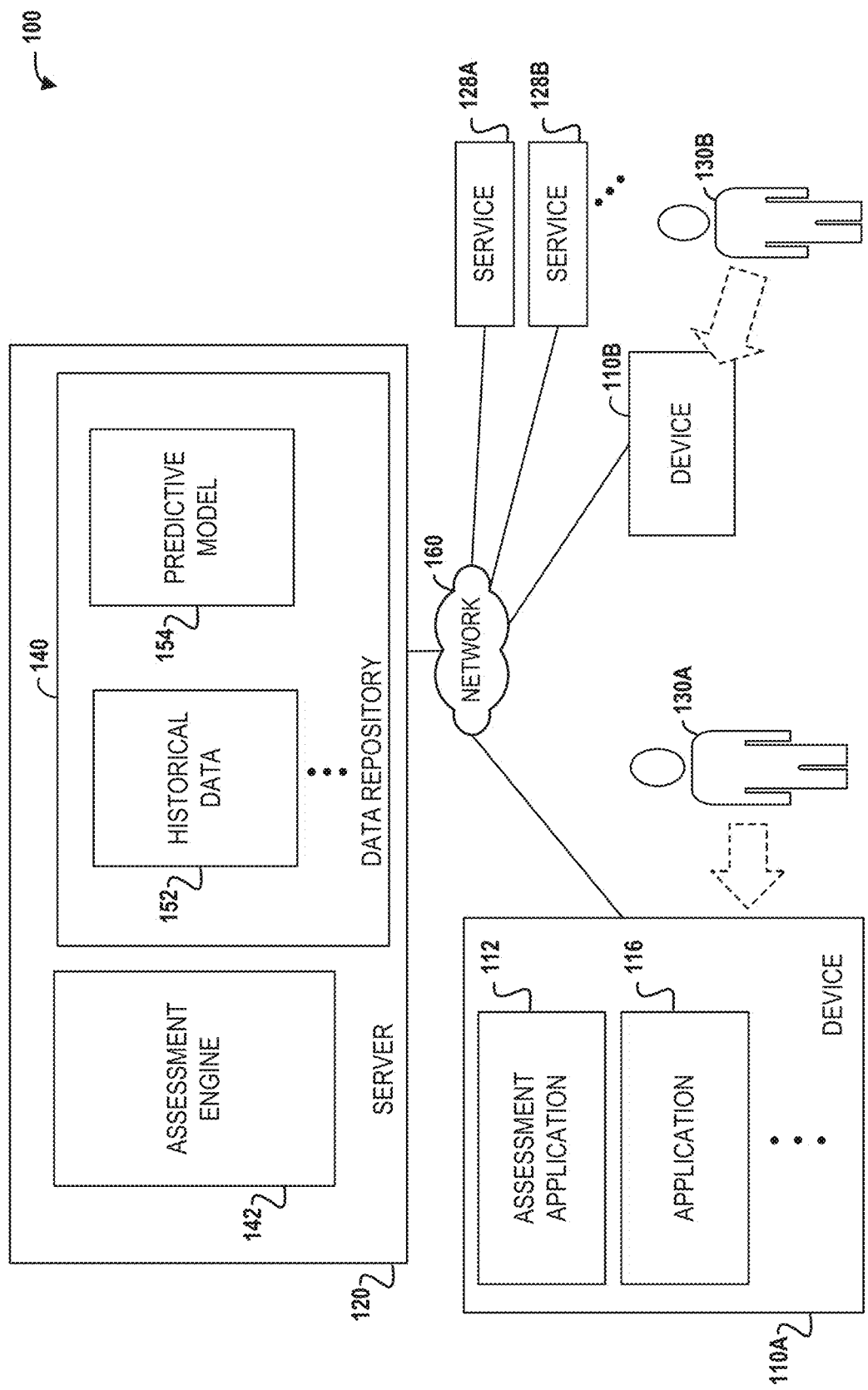
FIG. 1 illustrates an example system, in accordance with an example embodiment.

Aspects and implementations of the present disclosure are directed to a domain specific predictive model for entity assessment and valuation.

Existing technologies do not provide owners looking to sell businesses (e.g., Technology Services businesses) with a quantitative data-centric approach to accurately assess the value of their business at an early enough stage to give them a chance to substantively improve their valuation prior to a transaction. Among the problems owners have is not knowing where to spend their time and resources to optimize improvements that can make the greatest difference.

For example, existing approaches (e.g., in the investment banking industry) may generate financial and other analyses for a given company based on historical transactions for similar businesses. However, for many new technologies and/or businesses models, there may be little or no relevant historical transaction data for similar businesses. Without such historical transaction data, conventional approaches are incapable of generating accurate analyses for new technologies/inventions and business models. Because of these deficiencies, conventional approaches to valuing new technologies/inventions and models often miss opportunities. For example, existing approaches may value a given company too low, making the deal look "bad."

In contrast, the described technologies are configured to better quantify and accurately value companies based on aspects not captured or reflected in historical valuation approaches. Doing so provides enhanced and improved results in numerous scenarios, including in relation to valuing startup and new technology businesses. By finding quantifying aspects of such businesses based on factors other than historical valuations, the described technologies can value such companies more accurately and identify advantageous business and investments opportunities that conventional approaches may miss.

As described herein, the disclosed technologies enable owners to optimize investments they make around activities they target to improve their valuation, allowing them to invest where they are going to get the maximum return.

The described technologies can include a domain specific model generated with respect to various criteria such as holistic evaluation criteria. Such a model can be applied to historic transactions, e.g., for a specific segment of an industry to derive a predictive model. The predictive model can then be used to assess comparable businesses prior to them transacting, and then allowing them to use the generated predictive model to obtain a benchmarked view of their current valuation, as described herein.

Accordingly, it can be appreciated that the described technologies are directed to and address specific technical challenges and longstanding deficiencies in multiple technical areas, including but not limited to artificial intelligence, entity analysis, and interactive data visualization. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., (e.g., sensors, interfaces, etc.) operate to enable, improve, and/or enhance the described technologies, such as in a manner described herein.

It can be appreciated that current technologies may only be configured to enable business valuations based on each individual, and their firm's, experience in transacting similar companies. While they will scan an industry for previous transactions and do some compares, they perform a relatively cursory assessment. The criteria that is used for those assessments may predominantly be based on the financial health of a company given the backgrounds of bankers and their respective firms. They consistently lack current operational experience and make up for their lack of experience by often hiring consultants with domain backgrounds on a given pursuit. Those consultants are situational in nature and may only assess what is in front of them for a short period of time.

Accordingly, the described technologies can provide numerous improvements and enhancements beyond currently available options. For example, as described herein, the disclosed technologies can be configured to provide industry specific research, e.g., as performed on a significant number of historical transactions using various criteria. In certain implementations, such criteria can include criteria that accounts for multiple factors that impact valuations for a given industry (and not just financial health). Such criteria can further be reversed engineered on past transactions, thereby constructing a predictive model, as described herein. Such a predictive model can then be applied to future transactions. In doing so, enhanced valuations can be computed and recommendations generated, as described herein.

In certain implementations, the described technologies can be configured to identify various evaluation criteria. Such criteria can be identified, for example, by considering various domain specific aspects (some of which will be unique to an industry), for determining valuations. In doing so, a set of detailed questions to be considered for each criterion can be created. Additionally, in certain implementations scoring guidance can be generated and/or provided. As described herein, in certain implementations such scores can be scores out of 1.0 and the referenced guidance can reflect what constitutes a 0.0 score, a 1.0 score and a 0.5 score, which should be the norm of the industry.

In certain implementations, the described technologies can be configured to collect various information. In certain implementations, such information can be data that, for example, identifies publicly available historical M&A transactions. In certain implementations, such collection can be focused on information within a particular sector or industry, such as with respect to Technology Services businesses under $100 m in revenue in North America, Western Europe and Australia over the last 3 years. Having identified various entities, certain can be excluded based on various factors, such as those that do not fit a particular profile. It should be understood that the described predictive model can be effectively applied with respect to entities determined to be similar to and/or share various characteristics with the previously analyzed entitie(s).

Having identified the referenced entities, the described technologies can be configured to reverse engineer the application of previously determined criteria. In certain implementations, such reverse engineering can be implemented via research of various historical transactions. Sources that can be analyzed include but are not limited to press releases, web site reviews, social media trending data, ratings and other research sources. Various criteria can be scored (e.g., from 0 to 1.0), and a degree of confidence for the scoring of each transaction can also be rated (e.g., from 0 to 1.0). The revenue multiple that each business attained in each historical transaction is known based on publicly available data.

A multiple linear regression analysis can then be performed on the generated data set, as described herein. In doing so, a predictive model can be built. Additionally, various determinations can be computed by the multiple linear regression analysis with respect to the degree to which various criteria are to be weighted in the calculation of the valuation, as described herein.

A valuation of a prospective new business (e.g., a Technology Services business) can then be computed. In certain implementations, such a valuation can be computed using the referenced predictive model, e.g., after each criterion is scored for that business, and that scoring is loaded into the model. The referenced valuation can be the output of the model and can be displayed using various interactive visualizations, such as radar charts, as described herein.

In certain implementations, the described technologies can be further configured to load additional data into the model, e.g., based on new transactions that occur in the industry. Such new transactions can be scored using the reversed engineering process used to build the base model.

Once various prospective businesses that are scored are eventually sold and their revenue multiple is realized, corresponding data can be entered into the model and weighted higher than the previously loaded reversed engineered data on historic transactions. The model thus becomes more and more accurate over time as this data is loaded.

FIG. 1 depicts an illustrative system 100, in accordance with some implementations. As shown, system 100 includes device 110A and device 110B (collectively, devices 110), server 120, and services 128A and 128B (collectively, services 128). These (and other) elements or components can be connected to one another via network 160, which can be a public network (e.g., the Internet), a private network (e.g., a local area network (LAN) or wide area network (WAN)), or a combination thereof. Additionally, in certain implementations various elements may communicate and/or otherwise interface with one another.

Each of the referenced devices 110 can be, for example, a laptop computer, a desktop computer, a terminal, a mobile phone, a tablet computer, a smart watch, a personal digital assistant (PDA), a digital music player, a server, a wearable device, a virtual reality device, an augmented reality device, a holographic device, and the like. User 130A and user 130B (collectively, users 130) can be human users who interact with devices such as device 110A and device 110B, respectively. For example, user 130A can provide various inputs (e.g., via an input device/interface such as a keyboard, mouse, touchscreen, microphone—e.g., for voice/audio inputs, etc.) to device 110A. Device 110A can also display, project, and/or otherwise provide content to user 130A (e.g., via output components such as a screen, speaker, etc.).

Figure 9:
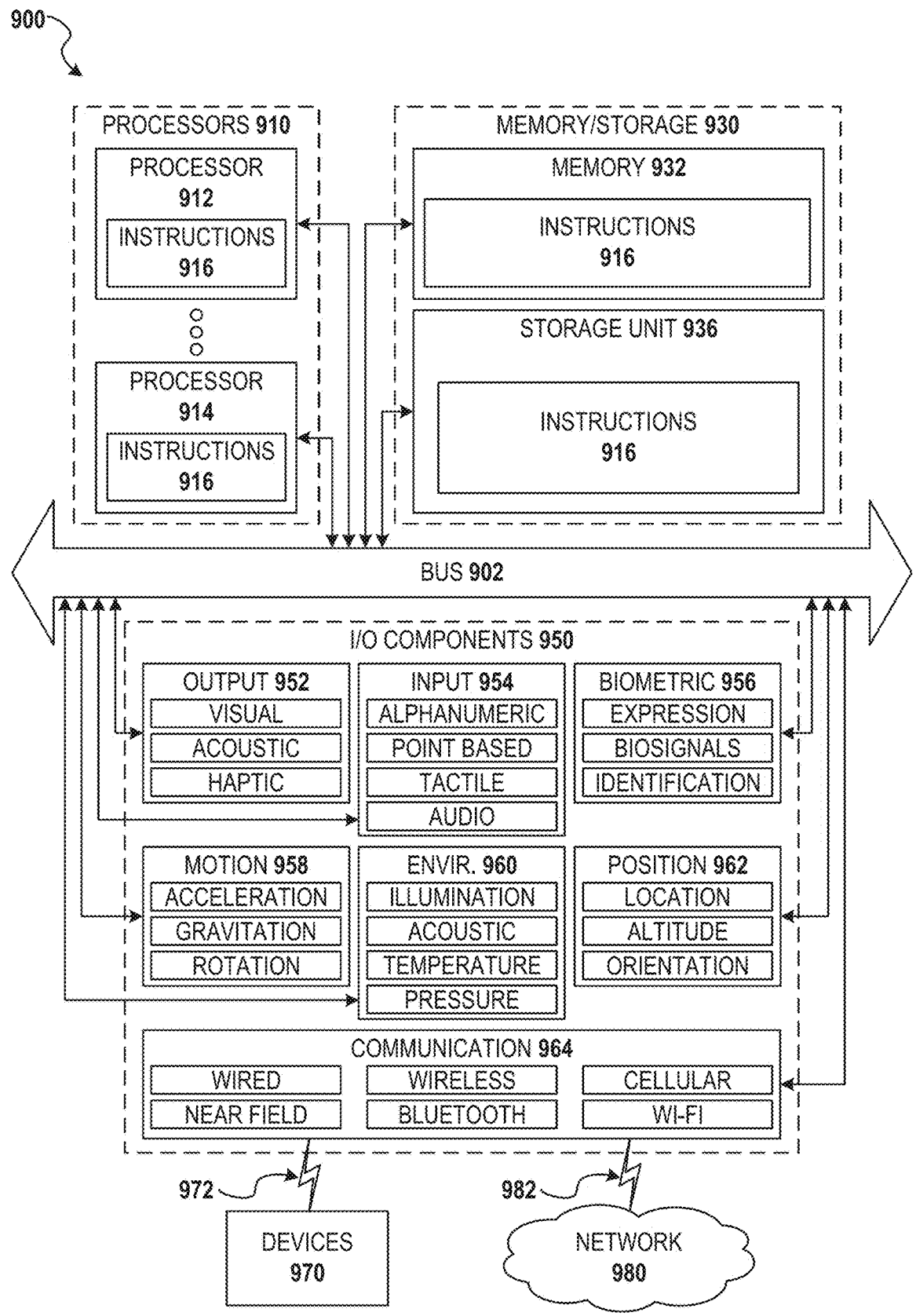
FIG. 9 is a block diagram illustrating components of a machine able to read instructions from a machine-readable medium and perform any of the methodologies discussed herein, according to an example embodiment.

It should be understood that, in certain implementations, devices 110 can also include and/or incorporate various sensors and/or communications interfaces (including but not limited to those depicted in FIG. 9 and/or described/referenced herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc. Additionally, in certain implementations devices 110 can be connected to and/or otherwise communicate with various peripheral devices.

In certain implementations, device 110A can include assessment application 112. Such an application 112 can be an executable set of instructions or modules that configure device 110A to perform various operations, such as are described herein. In certain implementations, application 112 can be configured to enable user 130A to generate and/or compute various scores, weights, recommendations, etc., as described in detail herein.

Application 112 can also be configured to generate and/or provide various visualizations, such as interactive visualizations of scores, weights, recommendations, and/or other information, as described herein. By interacting with application 112, a user can, for example, adjust various aspects of a score in order to project how a valuation may change based on the change of various criteria.

Additionally, in certain implementations, device 110 can include application(s) 116. Such applications may be configured to interface with application 112 in various scenarios, e.g., in order to request and/or provide data to/from a third-party service 128.

It should be understood that device 110B (operated by user 130B) can be configured with comparable capabilities. In doing so, multiple users can provide information, scores, recommendations, updates, etc., to server 120, thereby updating predictive model 154 in real time. Additionally, multiple users can simultaneously leverage the predictive model, e.g., to evaluate multiple entities at the same time.

At various points during the operation of described technologies, device 110 can communicate with one or more other devices, systems, services, servers, etc., such as those depicted in FIG. 1 and/or described herein. Such devices, systems, services, servers, etc., can transmit and/or receive data to/from the user device 110, thereby enhancing the operation of the described technologies, such as is described in detail herein. It should be understood that the referenced devices, systems, services, servers, etc., can be in direct communication with user device 110, indirect communication with user device 110, constant/ongoing communication with user device 110, periodic communication with user device 110, and/or can be communicatively coordinated with user device 110, as described herein.

At this juncture it should be noted that while the foregoing description has been directed to user device 110, various other devices, systems, servers, services, etc. (such as are depicted in FIG. 1 and/or described herein) can similarly incorporate the components, elements, and/or capabilities described with respect to device 110. It should also be understood that certain aspects and implementations of various devices, systems, servers, services, etc., such as those depicted in FIG. 1 and/or described herein, are also described in greater detail below in relation to FIG. 9.

Server 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server 120 can include components such as assessment engine 142 and data repository 140. Assessment engine 142 can be an application, set of executable instructions or modules, etc., that configured server 120 to perform various operations such as are described herein. For example, assessment engine 142 can configure service 120 to continuously generate and deploy the described predictive model, thereby generating the various scores, recommendations, etc., as described herein.

It should be understood that, in certain implementations, server 120 can also include and/or incorporate various sensors and/or communications interfaces (including but not limited to those depicted in FIG. 9 and described in relation to device(s) 110). The components can be combined together or separated in further components, according to a particular implementation. It should be noted that in some implementations, various components of server 120 may run on separate machines (for example, repository 140 can be a separate device). Moreover, some operations of certain of the components are described in more detail herein.

Data repository 140 can be hosted by one or more storage devices, such as main memory, magnetic or optical storage-based disks, tapes or hard drives, NAS, SAN, and so forth. In some implementations, repository 140 can be a network-attached file server, while in other implementations repository 140 can be some other type of persistent storage such as an object-oriented database, a relational database, and so forth, that may be hosted by the server 120 or one or more different machines coupled to server 120 via the network 160, while in yet other implementations repository 140 may be a database that is hosted by another entity and made accessible to server 120. In other implementations, repository 140 can be implemented within a distributed or decentralized system/environment (e.g., using blockchain, distributed ledger technology (DLT) and/or other decentralized or distributed computing/storage technologies).

In certain implementations, repository 140 can store data pertaining to and/or otherwise associated with various entities, and/or other information. In certain implementations, such stored information can pertain to aspects or characteristics of various companies, scores, ratings, and/or other metrics associated with such entities, and/or other such information such as is described herein. For example, as shown in FIG. 1, repository 140 can store historical data 152A which can include, for example, collected data, ratings, scores, weights, etc., associated with various entities, e.g., as described herein.

Additionally, as shown in FIG. 1, repository 140 can store and/or maintain predictive model 154. Predictive model can be, for example, a predictive linear regression model generated using machine learning and/or other such techniques. Such a model can be generated based on previous transaction(s) and can further be used to compute and project recommendations, as described in detail herein.

In certain implementations, various aspects of the described technologies operate in relation to various services such as service 128A and service 128B (collectively, services 128). Such services 128 can be, for example, third-party services that provide public and/or private information, and/or any other such services. Accordingly, various aspects of the generation of the described computational model, implementation of generated recommendations, and/or other operations, may be performed in conjunction with such services. For example, service 128A can be an information service that provides real-time data on private and/or public companies. The described technologies can utilize information from such a service in generating and/or updating model 154. By way of further example, service 128B can be a social media service. The described technologies can implement recommendations pertaining to social media presence and trending via such a service, as described herein.

It should be understood that though FIG. 1 depicts server 120 and devices 110 as being discrete components, in various implementations any number of such components (and/or elements/functions thereof) can be combined, such as within a single component/system.

In certain implementations, the described technologies can be configured to perform various diagnostic assessments, as described herein. The referenced assessments can be performed in relation to various evaluation criteria. In certain implementations, a score can be established or computed for each criterion (e.g., a score from 0 to 1.0). Such a score can, for example, be based on various key questions and/or a parameter for determining answers to the questions.

As described herein, various aspects of the described technologies can utilize dynamic models that are constructed and continuously updated. In certain implementations, such models can be built around assessments of previous transactions (e.g., mergers, acquisitions, etc.). in doing so, various determinations can be computed based on the referenced models.

The referenced determinations can also be presented via various dynamic/interactive interfaces/visualizations, as described herein. Such interfaces/visualizations can represent various aspects of business value, recommendations for improvement, and can also quantify various aspects which can cause changes in value, as described herein.

Additionally, in certain implementations the described technologies can be configured to identify various potential acquisition profiles, as described herein. Moreover, in certain implementations the described technologies can be configured to monitor various aspects of progress, e.g., on a quarterly basis. Potential acquisition profiles and/or other aspects can be further refined, as described herein.

Figure 2:
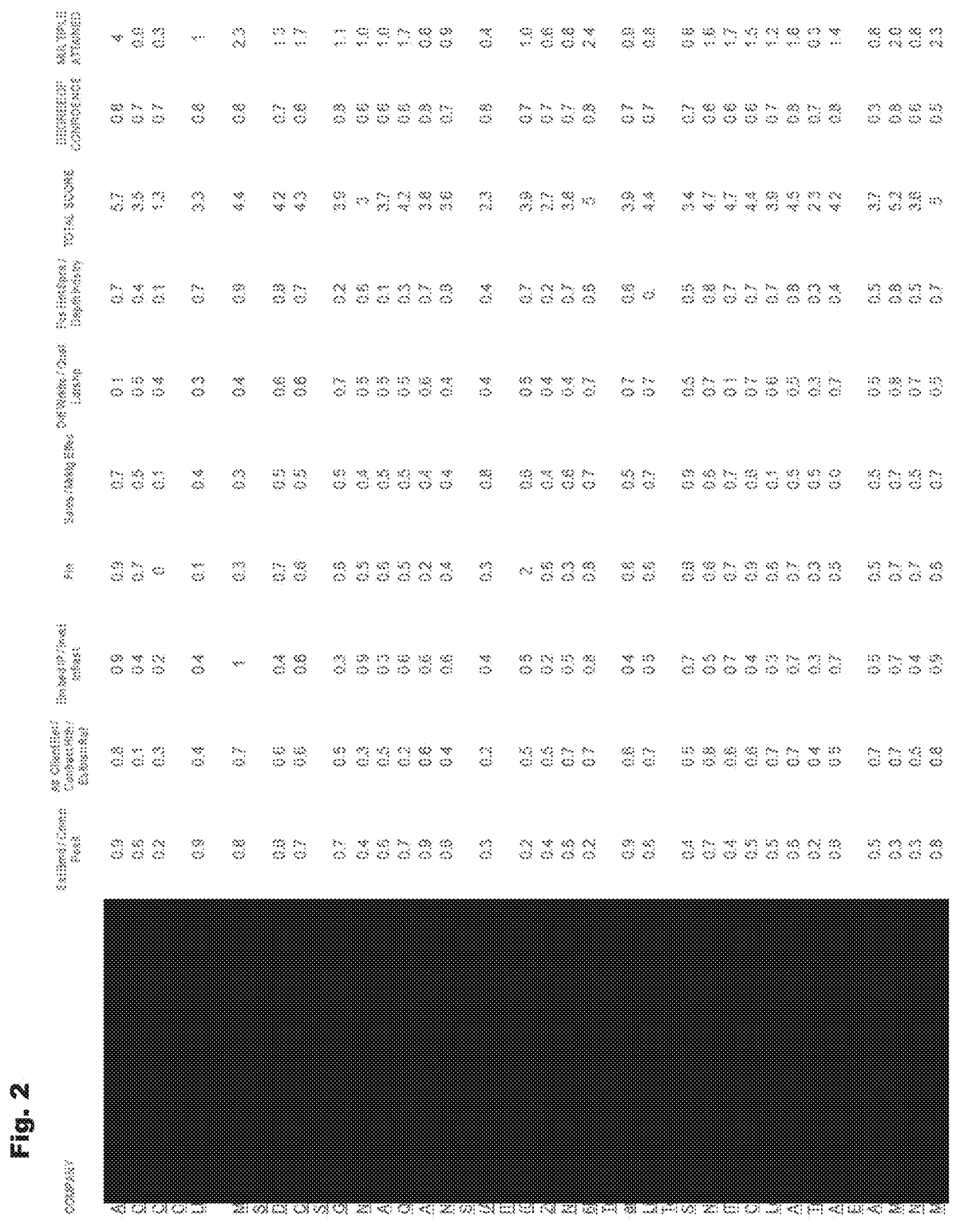

FIG. 2 depicts information corresponding to various previous transactions (e.g., M&A transactions). Using such information, a predictive linear regression model can be generated (e.g., using machine learning and/or other such techniques). It can be appreciated that such previous transaction can reflect various characteristics that correspond to value generation (e.g., for a particular sector) can further be used to compute and project recommendations, as described herein. For example, data reflecting that different companies sold at different multiples of revenue, together with various metrics of such companies, can be used to determine and/or project various factors that contribute to the value of a company.

In certain implementations, the described technologies can be configured to analyze, evaluate, and/or assess various criteria including but not limited to: established brand/competitive positioning, financial health, differentiated workforce/quality of leadership, Embedded IP/Investment in Infrastructure, Sales and Marketing Effectiveness, Focus on Hot Spaces/Depth of Industry Alignment, and Attractive Client Relationships/Contract Health/Established References. It should be understood that these criteria are provided by way of example and that other criteria can also be incorporated.

In performing the referenced evaluation(s), the described technologies can compute various determinations, including but not limited to the strengths of an entity. Such strengths can reflect, for example, aspects of various relationship(s) (e.g., between companies). Such strengths can also reflect geographic location, remote workforce model, retention programs for top talent, depth of expertise in certain technical areas, relationship(s) with local universities, embedded relationships, delivery successes yielding repeat customers, a set of industry solutions, and/or a wide portfolio of referenceable engagements. Additionally, further factors that can be accounted for include but are not limited to: delivery centers constructed to enable providing of scalable, low cost 'work products' using a near-shoring factory model that is attractive to public sector and education industry clients, leverage of inside sales organization(s), yield from a sales team(s), operational leadership and overall discipline, and/or culture. It should be understood that the referenced strengths are provided by way of example, and that different strengths can be identified with respect to different entities.

Moreover, in certain implementations the described technologies can compute various determinations, including but not limited to aspects which may require improvement. For example, price paid, debt position, ability to invest, anticipated growth, marketing ability, client successes, analytics expertise, webinar programs, delivery centers, and offering portfolio, prescriptive market segmentation, solution portfolios, credibility relative to industry specific solutions, reliance on other technologies, intellectual property value that could be featured in a transaction cycle, geographic limits on opportunities to acquire and retain top talent, socialization of value proposition across company, reliance on sales resources, size of Software Reseller portfolio vs Consulting portfolio.

In certain implementations, the described technologies can also be configured to identify and/or generate various opportunities. Such opportunities can include but are not limited to: turn delivery center into a scalable analytics factory/services cloud model with formal methods and processes, initiate relationships with State or University Systems, build out industry aligned solutions that are formally hardened and productized, sell as an industry accelerator in your engagement model, create offerings around situational predictive analytics that provide data science talent, shift the culture toward a high value consultancy, hire marketing lead(s), promote examples of where you are delving into advanced analytics, and feature it around a web presence, aggressively seek white label relationship(s), acquire small partner focused on content management, Data Management, etc. It should be understood that the referenced opportunities are provided by way of example, and that different opportunities can be identified with respect to different entities.

By way of further illustration, aspects of the referenced opportunities can be configured with respect to a Factory/'Services Cloud.' Such services can be further configured to automate creation of business content, as described herein. For example, a design center can be included where work is packaged and dispatched via work packets to assembly lines. Specialized assembly lines can be equipped with skills, tools and automation. Governance can be implemented across entire factory, including measurements & metrics management. A reusable asset library/catalog with extensions into the industry eco-system can also be incorporated. Work Management capabilities can thus be enabled by differentiating technology. Additionally, a common Process and quality Framework can be consistently adopted across the described factory. In doing so, an environment comprised of tools, processes and repositories, that enables geographically distributed teams to coordinate multiple work packets effectively and efficiently can be implemented. As noted, the referenced opportunities are provided by way of example, and different opportunities may be identified with respect to different entities.

The described technologies can also be configured to identify various threats, as described herein. Such threats can include but are not limited to: heavy reliance on certain technologies, demand Generation, and Delivery Center could be an exposure if certain the relationships change, lack of funding for investment around key initiatives, failure to act on hiring marketing leadership, successes to date and innovative assets could stall momentum, loss of top talent—especially sales and top technical talent, not being able to demonstrate client satisfaction and referenceability to potential acquirer, competitor's demands of similar levels of support, troubled project(s), lack of investment, inability to capitalize on market momentum and service growing demand, thereby allowing new entrants into market and creating new competitors, creditor shifts toward less flexible and less favorable terms relative to debt. It should be understood that the referenced threats are provided by way of example, and that different threats can be identified with respect to different entities.

The described technologies can then be configured to compute various scores and other statistics based on the above referenced assessments, as described herein. Such scores can be, for example, within a range of 0 to 1.0 for each attribute (e.g., in order to facilitate the described machine learning analysis). For example, a score of 0 can reflect a low end of a score range, 1.0 can reflect the top end of the range, and 0.5 can be a normal score (e.g., for answers to various questions, such as those utilized in assessing aspects of an entity).

In certain implementations, an example score can correspond to and/or reflect differentiated Workforce/Quality of Leadership. Such a score can include positive aspects including but not limited to: high performing senior leadership team, a location that provides stability for the business with proven access to university talent and great cost of living, senior expertise around analytics, colocation open floorplan model established, work from home opportunities for key roles, hub(s) well positioned as a powerful recruiting/training engine, and overflow value.

Such a score can further include various aspects that may reflect challenges including but not limited to: leadership is not as strong as desired, work from home model is less efficient, retention exposure for early career talent, must consider alternatives and be ready to make a move, more formal relationships are needed to impress potential buyer, consider Partner/Associate model.

In certain implementations, another example score can correspond to and/or reflect Focus on Hot Spaces/Depth of Industry Focus. Such a score can include positive aspects including but not limited to: deep focus on Data Analytics, current focus on predictive analytics, staying in tune with the leading-edge technologies like Blockchain, AI, cloud computing, cybersecurity, digital transformation, etc. recognizing the need for industry specialization.

Such a score can further include various aspects that may reflect challenges including but not limited to: seasoned talent not oriented toward pushing on the leading edge around innovation, using new hires to push them is helpful, but not optimal, CTO needs to help culturally, no hardening of an industry solution in place, innovation culture not fully established, identifying, challenging and enabling key influencers.

In certain implementations, another example score can correspond to and/or reflect attractive Client Relationships/Contract Health/Established References. Such a score can include positive aspects including but not limited to: no troubled projects, contract profitability supports client success, many clients hire for a follow-up engagement, appear to have great customer success stories in each industry, videographer has been hired to promote the solution portfolio and capture client successes, some leadership on engagements.

Such a score can further include various aspects that may reflect challenges including but not limited to: lack of demonstrated client success stories or real references, no ongoing program or process to capture client satisfaction with each engagement, few certified Project Managers in the business, while there are very structured review processes in place to oversee delivery success, not clear that anybody is measured on client satisfaction or reference creation, no reliant overflow value for talent acquisition.

In certain implementations, another example score can correspond to and/or reflect Established Brand/Competitive Positioning. Such a score can include positive aspects including but not limited to: building a reputation within a business partner community as a premiere provider of analytics talent, Business Partner awards, rate structure has held steady and you have not commoditized your talent in order to win business, webinars are a major plus—forum could be used to promote analytics thought leadership.

Such a score can further include various aspects that may reflect challenges including but not limited to: no external evidence that the brand has been established in the marketplace, while value proposition exists, it is not embedded in culture, value proposition itself needs work and needs to be socialized externally and internally, brand promotion and value proposition needs improvement, web presence, analyst community, media, etc., not getting deserved credit your for community support.

In certain implementations, another example score can correspond to and/or reflect sales/Marketing Effectiveness. Such a score can include positive aspects including but not limited to: currently have sales resources that are driving substantial sales, tightly aligned with major customer, substantial % of software purchases bring some services business, healthy pipeline for Consulting and software sales and disciplines sales management process, webinar program provides great demand generation, analytics roadmap offering is an excellent opportunity to gain access to key influencers and provide client leadership.

Such a score can further include various aspects that may reflect challenges including but not limited to: Marketing demand generation programs, client success stories, offering/value proposition promotion, and digital presence, consulting hunting engine, offerings being sold to different markets, not filling pipeline in a prescriptive manner.

In certain implementations, another example score can correspond to and/or reflect Financial Health. Such a score can include positive aspects including but not limited to: sophisticated operational and planning processes—from sales to delivery, including risk management, strong operational metrics around utilization, lack of troubled projects and contract profitability, pyramid of talent, pipeline and closure rates, business metrics across the board appear to be tracking in the right direction.

Such a score can further include various aspects that may reflect challenges including but not limited to: debt position is high and inhibiting needed investment, which is in turn, inhibiting growth opportunities, which will potentially cause loss of momentum, aspects of a business that fundamentally devalue it to a potential acquirer, not taking for granted operational discipline as business grows.

In certain implementations, another example score can correspond to and/or reflect embedded IP/Investment in Infrastructure. Such a score can include positive aspects including but not limited to: completed work of delivering analytics solutions for multiple industries that have real commonalities, relationships with major customers, frameworks and methodologies are strong, offerings include established practice leadership and deep expertise. In certain implementations, the referenced scores can be determined with respect to various preconstructed questions.

Such a score can further include various aspects that may reflect challenges including but not limited to: revenues originating from reselling software, software selling can become a distraction to a services business, and a potential conflict of interest, considerable efforts needed to harvest and manage all that you have done around offering management and IP.

It should be understood that the described scores (and their various aspects) are provided by way of example and that any number of other scores, aspects, etc., are also contemplated. Additionally, the referenced scores/aspects can be further configured with respect to particular industries, companies, etc., as appropriate.

Additionally, in certain implementations the described technologies can be configured to generate various visualizations. In certain implementations, such visualizations can present various aspects of the scores referenced here, and/or other metrics. Additionally, in certain implementations the referenced visualizations can be configured to enable user interaction—e.g., to enable adjustment of various parameters, as described herein. In doing so, users can, for example, simulate how changes to various aspects of a company (e.g., as reflected in the scores described herein)

can change an overall composite score (which can reflect, for example, a multiple of revenue that the company can be projected to be acquired for).

Figure 3:
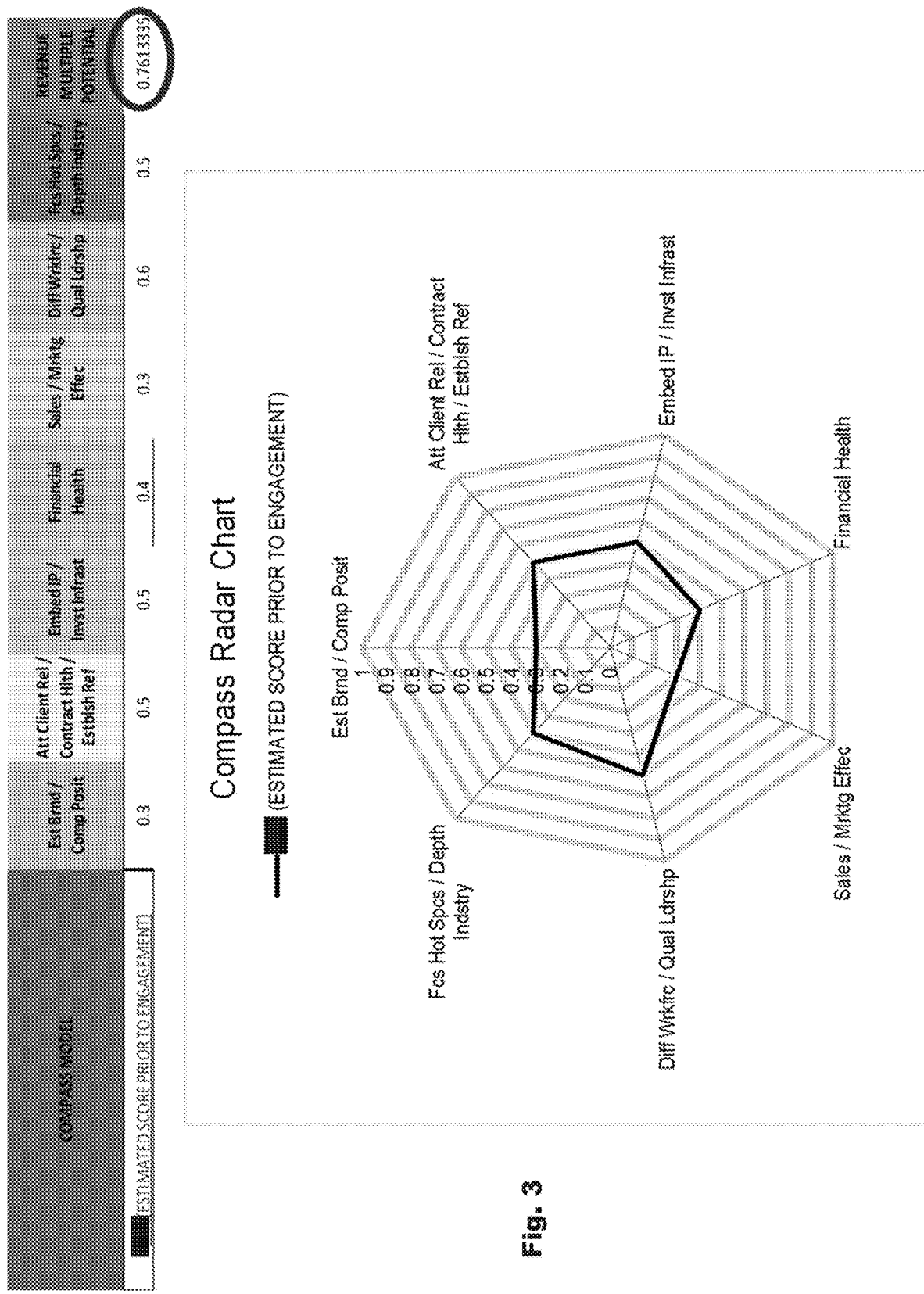

By way of illustration, FIG. 3 depicts an example visualization that can be presented to and/or interacted with by a user. As shown in FIG. 3, the depicted visualization can reflect an estimated score chart, reflecting various score(s) that can be generated (e.g., as described herein) prior to initiating client engagement. Such a visualization can be generated based on publicly available resources, such as press releases, website content, GlassDoor content, Google trending data about an entity, etc. As shown in FIG. 3, the depicted chart can reflect scores as described herein, as well as an overall (e.g., composite, average, etc.) score.

Figure 4:
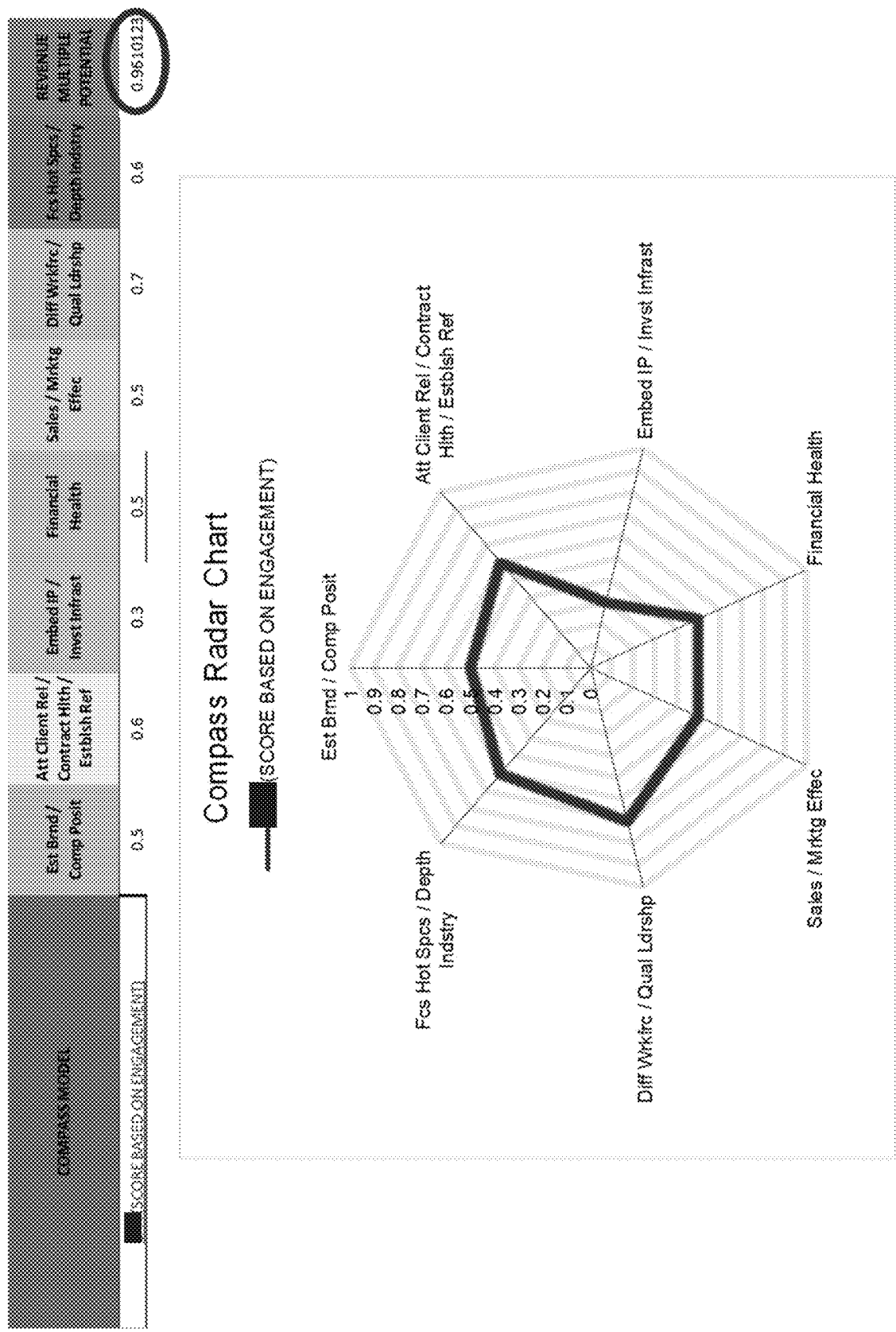

Upon implementing various recommendations, improvements, etc., (as described herein), the described technologies can be configured to reevaluate the entity under analysis. FIG. 4. depicts an example visualization that can be presented to and/or interacted with by a user. As shown in FIG. 4, the depicted visualization can reflect an estimated score chart, reflecting various score(s) that can be generated (e.g., as described herein) after initiating adjustments, improvements, etc. As shown in FIG. 4, the depicted chart can reflect scores as described herein, as well as an overall (e.g., composite, average, etc.) score.

Examples of the referenced recommendations include but are not limited to recommendations to increase brand value. For example, based on an analysis of factors associated with the entity under analysis, and further based on a referenced predictive model (which leverages results determined with respect to other entities), the described technologies can generate recommendations including but not limited to: drive offering depth around an industry by creating an anchor industry, selling cross-industry synergy as extension to anchor.

Such recommendations can be further weighted based on various factors including but not limited to business value to buyer, feasibility for the entity under analysis, and/or other considerations. For example, certain recommendations may be particularly influential with respect to a prospective buyer (e.g., by demonstrating industry depth). By way of further examples, certain recommendations.

Another example recommendation can include harden factory/'Analytics Services model with processes, methods, and people. Such a recommendation can be weighted with an example weight of: Business value to Buyer; 9 (extremely high—shows unique senior skills attached factory model—high skills/low cost.

Such a recommendation can also be weighted with an example weight of: feasibility; 6 (know how to do this—use framework, collateral, pricing. Demonstrate ability to build this—consider 'analytics cloud' announcement in partnership with other entities).

Another example recommendation can include create a data science based predictive analytics managed service offering and run the offering out of the factory/services cloud model. Such a recommendation can be weighted with an example weight of: business value to Buyer; 10 (managed service on the cloud 'Situational' Predictive capabilities would be very high value and would bring in new clients).

Such a recommendation can also be weighted with an example weight of: feasibility; 5 (use base factory, but still a lot of work)

Another example recommendation can include hire more services sales talent to drive services professional placements. Such a recommendation can be weighted with an example weight of: business value to Buyer; 8 (it will raise EBITDA quickly if stay focused on services). Such a recommendation can also be weighted with an example weight of: feasibility; 8 (easy if hiring the right people).

Another example recommendation can include hire a business development resource to drive more embedded relationships with key customers. Such a recommendation can be weighted with an example weight of: business value to Buyer; 9 (automatic demand generation engine). Such a recommendation can also be weighted with an example weight of: feasibility; 7 (needs to be a senior level business development person.

Another example recommendation can include harden relationship with key customer(s) around inside sales support. Such a recommendation can be weighted with an example weight of: business value to Buyer; 7 (important not to lose this relationship). Such a recommendation can also be weighted with an example weight of: feasibility; 4 (this resource will be expensive).

Another example recommendation can include net promoter score (NPS) implementation to gather verifiable customer input as evidence of customer success to buyer. Such a recommendation can be weighted with an example weight of: business value to Buyer; 7 (high retention rate). Such a recommendation can also be weighted with an example weight of: feasibility; 8 (doing this with already, no cost).

Another example recommendation can include create a clear line of synergy between selling and consulting for each business segment. Such a recommendation can be weighted with an example weight of: business value to Buyer; 8 (important for an acquirer to recognize the synergistic value between SW revenue and Consulting revenue). Such a recommendation can also be weighted with an example weight of: feasibility; 6 (doing this without reducing overall revenue is the challenge).

Another example recommendation can include Marketing/Digital Presence/Branding refresh. Such a recommendation can include aspects such as: Modernize web site—build around current best practices. Such a recommendation can be weighted with an example weight of: business value to Buyer; 5. Such a recommendation can also be weighted with an example weight of: feasibility; 7 (opportunity to mimic fundamentals of others).

Such a recommendation can also include aspects such as: hire a marketing leader, promote offering portfolio and customer references, begin some demand generation campaigns. Such a recommendation can be weighted with an example weight of: business value to Buyer; 7 (opportunity to highlight industry aligned offerings—customer references a plus) Such a recommendation can also be weighted with an example weight of: feasibility; 5 (outside help needed but also offering mgmt. work required and getting customer to agree to be referenced).

Such a recommendation can include aspects such as: webinar promotion and integration into web presence with integrated demand generation, and execute formal targeted marketing/demand generation campaigns, promotion of factory/services cloud engine along with managed service offering around predictive analytics. Such a recommendation can be weighted with an example weight of: business value to Buyer; 8 (huge benefit to build brand with webinar promotion and promotion of factory along with demand gen engine ramp) Such a recommendation can also be weighted with an example weight of: feasibility; 3 (significant cost in resource and outside firm to do this in a quality manner).

Another example recommendation can include acquire other companies by targeting other 'non-attended to' markets, and replicate model. Such a recommendation can be weighted with an example weight of: business value to Buyer; 10 (tremendous opportunity to replicate the model and leverage the markets, would incrementally change the value of the business and the buyer profiles). Such a recommendation can also be weighted with an example weight of: feasibility; 2 (would require significant investment, but there would be efficiencies.)

Figure 5:
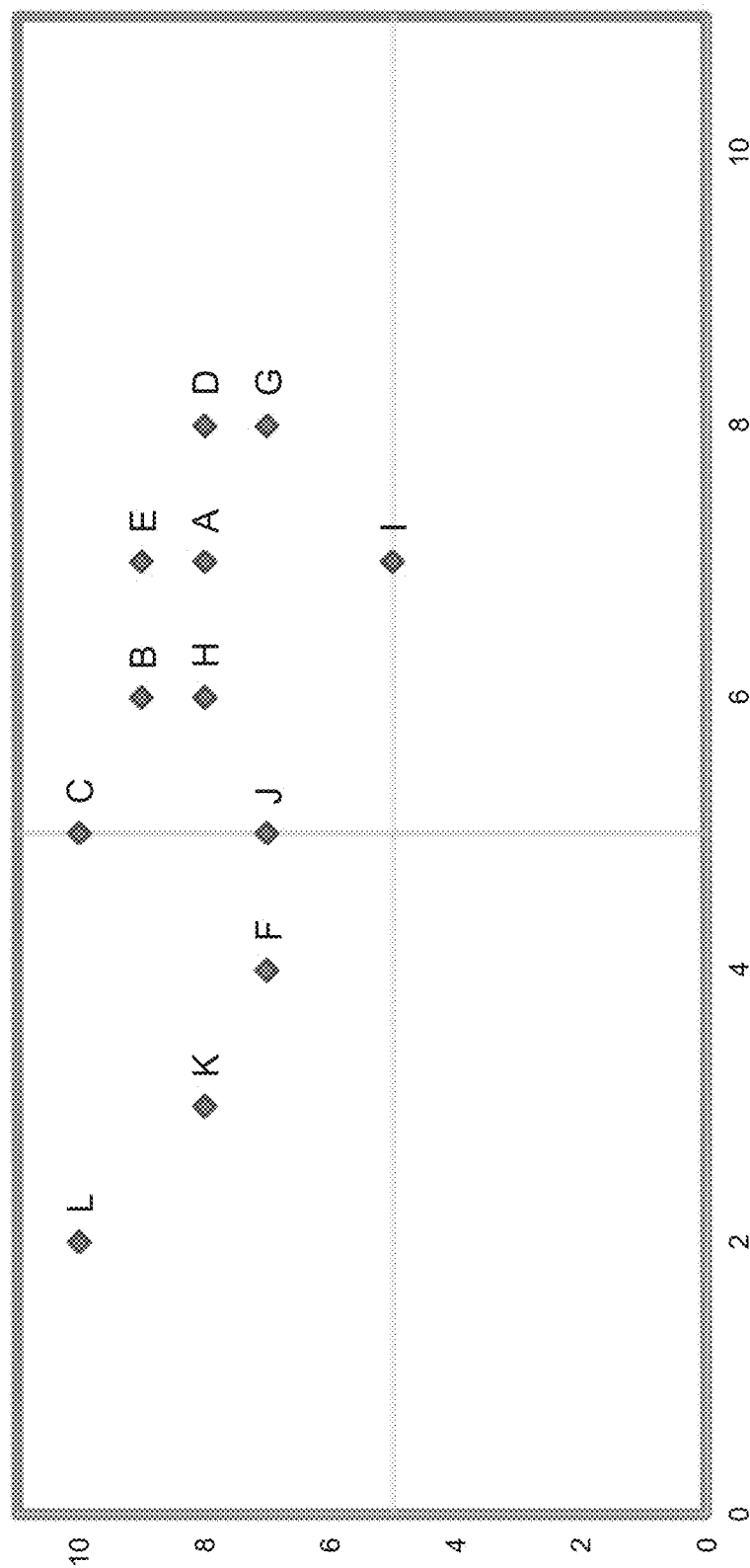

In certain implementations the described technologies can be configured to generate various visualizations that represent aspects of the referenced recommendations, together with their accompanying weights. For example, FIG. 5 depicts an example visualization in which the X axis corresponds to the feasibility weight associated with a recommendation, which the Y axis corresponds to a value to buyer weight associated with a recommendation (e.g., in accordance with the weights provided herein). In doing so, those recommendations that are most feasible and/or most valuable can be readily identified and/or prioritized, as described herein.

By way of further illustration, the various points depicted in FIG. 5 can correspond to the following recommendations:

A) Drive offering depth around one industry by creating an anchor industry, sell cross-industry synergy as extension to anchor.

B) Harden factory/services cloud model with processes, methods and people.

C) Create a data science based predictive analytics managed service offering and run the offering out of the hardened services factory/cloud model.

D) Hire more services sales talent to drive services professional placements.

E) Hire a business development resource to drive more embedded relationships.

F) Harden relationships around inside sales support.

G) Net promoter score (NPS) implementation to gather verifiable customer input.

H) Create a clear line of synergy between selling and consulting for each segment—divest if and where there is no synergy.

I) Modernize web site—build around current best practices.

J) Promote offering portfolio and customer references.

K) Webinar promotion and integration to web presence.

L) Acquire other comparable companies with other 'non-attended to' markets, and replicate model.

Figure 6:
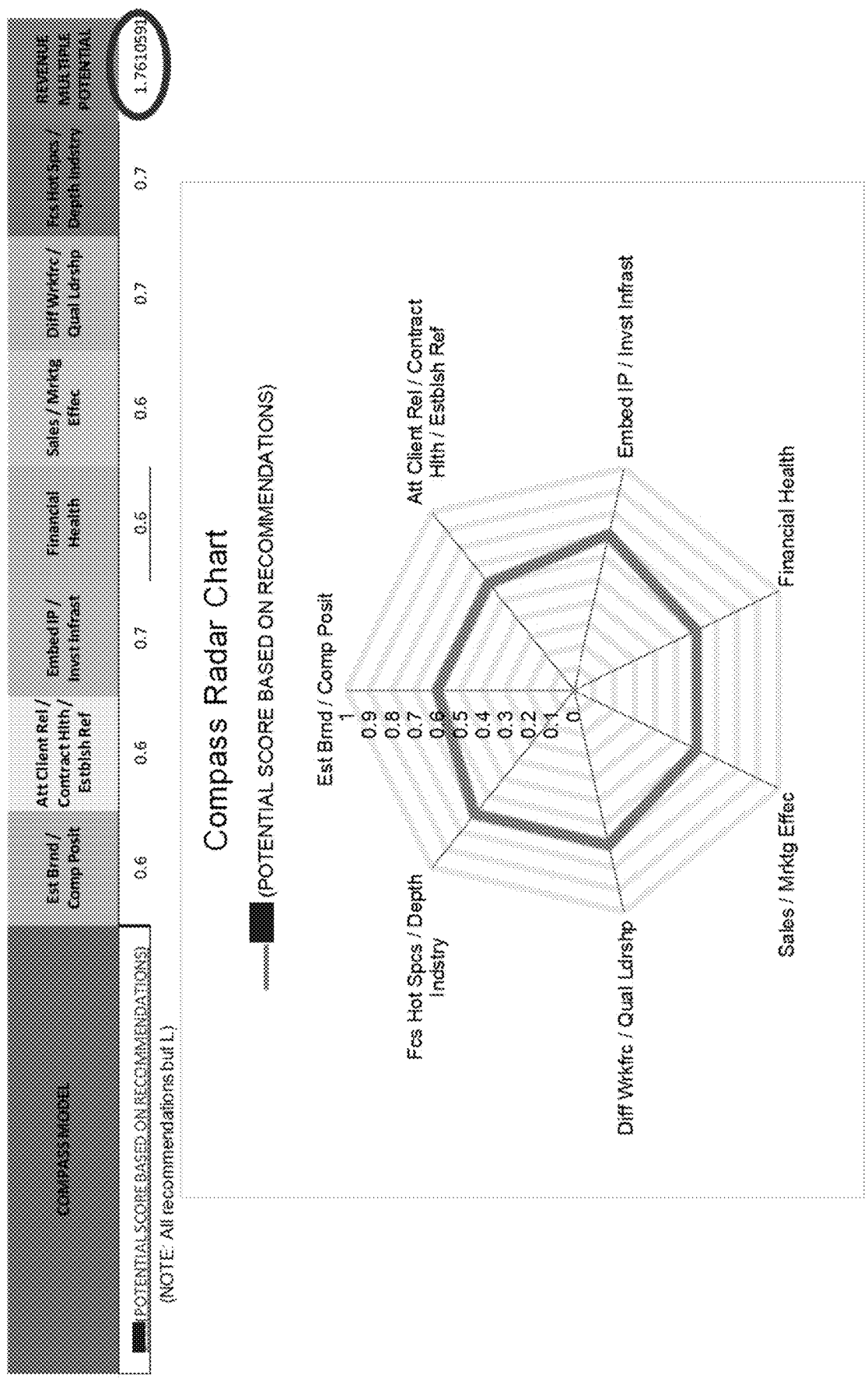

In conjunction with implementing various recommendations, improvements, etc., (as described herein), the described technologies can be configured to compute a projected/potential score for the entity under analysis—that is, the manner in which such score(s) have the potential to change/improve upon implementing the described recommendations. FIG. 6. depicts an example visualization that can be presented to and/or interacted with by a user. As shown in FIG. 6, the depicted visualization can reflect an estimated score chart, reflecting various potential score(s) that can be generated (e.g., as described herein) after initiating adjustments, improvements, etc., per recommendations stated previously. As shown in FIG. 6, the depicted chart can reflect scores as described herein, as well as an overall (e.g., composite, average, etc.) score.

The scores shown in FIG. 6 can be manipulated via a 'sensitivity analysis' process with the client to interactively determine the degree to which implementing certain recommendations will change the various scores, and what effect those scores will have on the future valuation of a client's business. This sensitivity analysis allows clients to optimize where to invest in their business.

Figure 7:
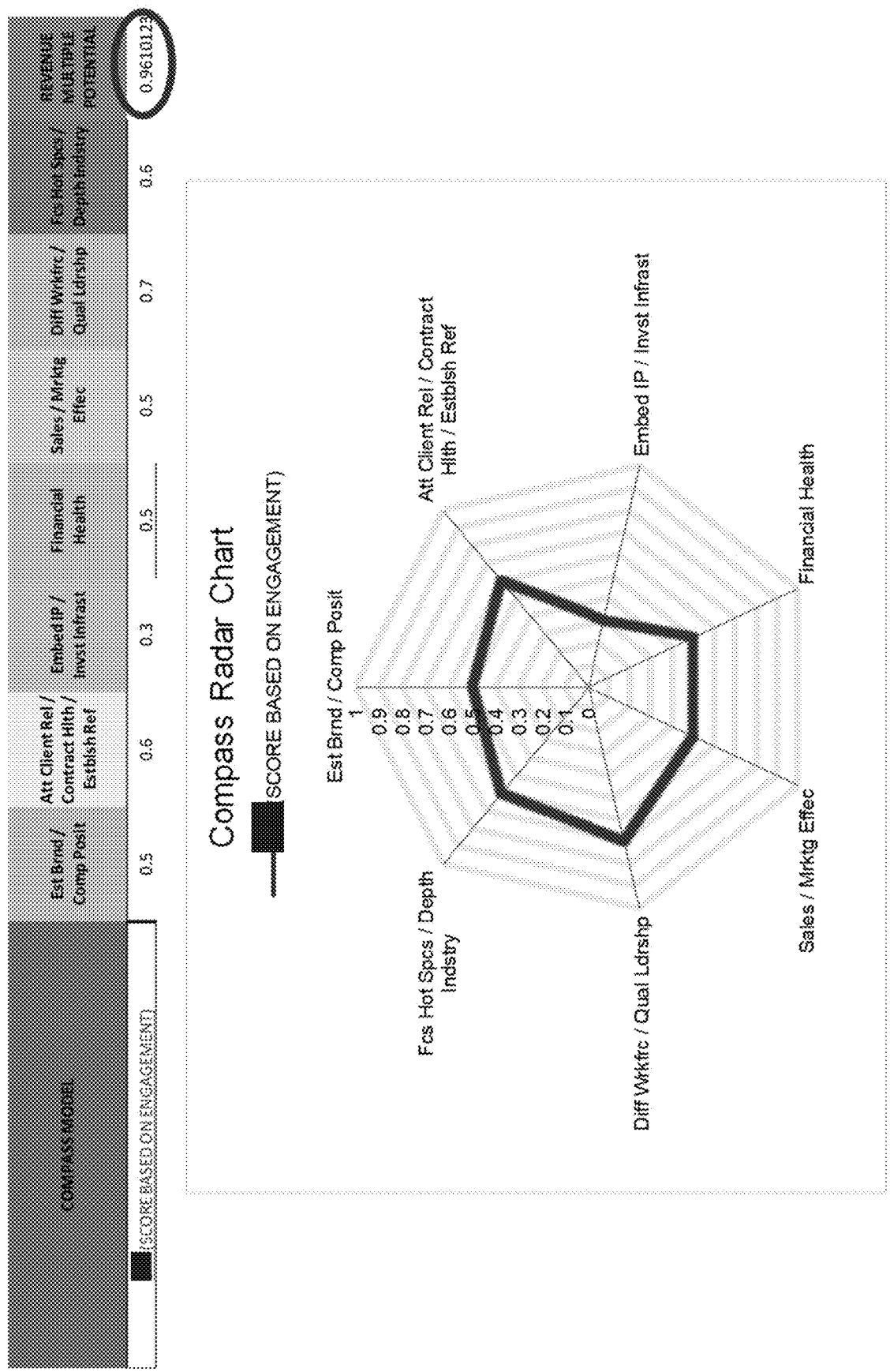

FIG. 7. depicts another example visualization that can be presented to and/or interacted with by a user. As shown in FIG. 7, the depicted visualization can reflect an score chart, reflecting various actual score(s) that can be computed (e.g., as described herein) based on current state and can be used to compare to future potential in FIG. 6. As shown in FIG. 7, the depicted chart can reflect scores as described herein, as well as an overall (e.g., composite, average, etc.) score.

The described technologies can also be configured to compute early identification of potential acquirers (e.g., with respect to a particular entity, company, etc.). Such buyers can be characterized according to buyer type such as strategic Buyers. Such strategic buyers can be included for reasons including strategically acquiring add-ons to obtain leading edge analytics enterprise capabilities, functional Extension; protect analytics market share, client relationship and Client Extension, and expanding operational capabilities.

Such buyers can also be characterized according to buyer type such as value Add Buyers. Such buyers can be included for reasons including strategically acquiring assembled analytics workforce and assets, client Extension to higher value buyers within enterprise, outsourcing firms interested in deep analytics capabilities with scalable delivery center.

Such buyers can also be characterized according to buyer type such as Synergistic Buyers. Such buyers can be included for reasons including Business Partners interested in Analytics capabilities, international technology companies interested in services extension around analytics in US, analytics services companies interested in factory model.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 8:
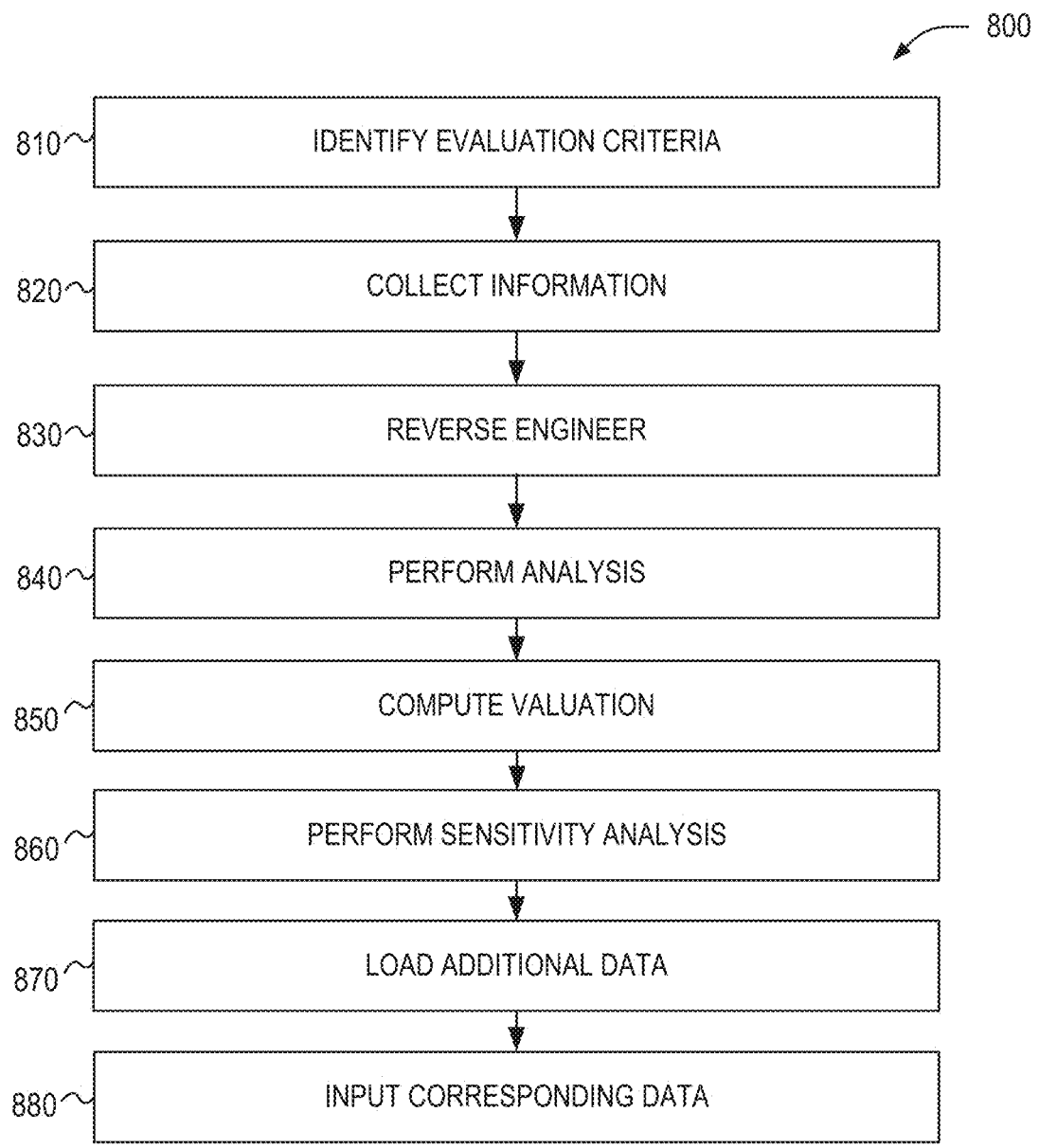
FIG. 8 is a flow chart illustrating a method, in accordance with example embodiments, for domain specific predictive model for entity assessment and valuation.

FIG. 8 is a flow chart illustrating a method 800, according to an example embodiment, for domain specific predictive modeling for entity assessment and valuation. The method is performed by processing logic that can comprise hardware (circuitry, dedicated logic, etc.), software (such as is run on a computing device such as those described herein), or a combination of both. In one implementation, the method 800 is performed by one or more elements depicted and/or described in relation to FIG. 1 (including but not limited to server 120, assessment engine 142, and/or devices 110), while in some other implementations, the one or more blocks of FIG. 8 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 810, evaluation criteria can be identified. Such criteria can be identified, for example, by considering various domain specific aspects (which may be unique to an industry), for determining valuations. In doing so, a set of detailed questions to be considered for each criteria can be created. Additionally, in certain implementations scoring guidance can be generated and/or provided. As described herein, in certain implementations such scores can scores out of 1.0 and the referenced guidance can reflect what constitutes a 0.0 score, a 1.0 score and a 0.5 score, which should be the norm of the industry.

At operation 820, information can be collected. In certain implementations, such information can be data that, for example, identifies publicly available historical M&A transactions. In certain implementations, such collection can be focused on information within a particular sector or industry, such as with respect to Technology Services businesses under $100 m in revenue in North America, Western Europe and Australia over the last 3 years. Having identified various entities, certain can be excluded based on various factors, such as those that do not fit a particular profile.

At operation 830, the application of previously determined criteria can be reverse engineered. That is, having identified the referenced entities, the described technologies can be configured to reverse engineer the application of previously determined criteria. In certain implementations, such reverse engineering can be implemented via research of various historical transactions. Sources that can be analyzed include but are not limited to press releases, web site reviews, ratings and other research sources. Various criteria can be scored (e.g., from 0 to 1.0), and a degree of confidence for the scoring of each transaction can also be rated (e.g., from 0 to 1.0). In doing so, the revenue multiple that each business attained in each transaction can be computed At operation 840, an analysis can be performed. In certain implementations, such an analysis can be a multiple linear regression analysis that can be performed on the generated data set, as described herein. In doing so, a predictive model can be built. Additionally, in certain implementations various determinations can be computed with respect to the degree to which various criteria are to be weighted in the calculation of the valuation, as described herein.

At operation 850, a valuation can be computed. In certain implementations, such a valuation can be a valuation of a prospective new business (e.g., a Technology Services business). In certain implementations, such a valuation can be computed using the referenced predictive model, e.g., after each criteria is scored for that business, and that scoring is loaded into the model. The referenced valuation can be the output of the model and can be displayed using various interactive visualizations, such as radar charts, as described herein.

At operation 860, a sensitivity analysis is performed. For example, a sensitivity analysis can be performed with respect to an entity to determine optimal investments to increase business valuation.

At operation 870, additional data can be loaded, e.g., into the model. In certain implementations, such data can be loaded based on new transactions that occur in the industry. Such new transactions can be scored using the reversed engineering process used to build the base model.

At operation 880, corresponding data can be input. For example, once various prospective businesses that are scored are eventually sold and their revenue multiple is realized, corresponding data can be entered into the model and weighted higher than the previously loaded reversed engineered data on historic transactions. The model thus becomes more and more accurate over time as this data is loaded.

It should also be noted that while the technologies described herein are illustrated primarily with respect to assessment of entities, the described technologies can also be implemented in any number of additional or alternative settings or contexts and towards any number of additional objectives.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 9 is a block diagram illustrating components of a machine 900, according to some example implementations, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. The instructions 916 transform the non-programmed machine into a particular machine programmed to carry out the described and illustrated functions in the manner described. In alternative implementations, the machine 900 operates as a standalone device or can be coupled (e.g., networked) to other machines. In a networked deployment, the machine 900 can operate in the capacity of a server machine or a client machine in a server-client network environment, or as a peer machine in a peer-to-peer (or distributed) network environment. The machine 900 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 can include processors 910, memory/storage 930, and I/O components 950, which can be configured to communicate with each other such as via a bus 902. In an example implementation, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 912 and a processor 914 that can execute the instructions 916. The term "processor" is intended to include multi-core processors that can comprise two or more independent processors (sometimes referred to as "cores") that can execute instructions contemporaneously. Although FIG. 9 shows multiple processors 910, the machine 900 can include a single processor with a single core, a single processor with multiple cores (e.g., a multi-core processor), multiple processors with a single core, multiple processors with multiples cores, or any combination thereof.

The memory/storage 930 can include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 can also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions (e.g., instructions 916) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine (e.g., processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 can include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 can include many other components that are not shown in FIG. 9. The I/O components 950 are grouped according to functionality merely for simplifying the following discussion and the grouping is in no way limiting. In various example implementations, the I/O components 950 can include output components 952 and input components 954. The output components 952 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 950 can include biometric components 956, motion components 958, environmental components 960, or position components 962, among a wide array of other components. For example, the biometric components 956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 can include acceleration sensor components (e.g., accelerometer), gravitation sensor components, rotation sensor components (e.g., gyroscope), and so forth. The environmental components 960 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 962 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 950 can include communication components 964 operable to couple the machine 900 to a network 980 or devices 970 via a coupling 982 and a coupling 972, respectively. For example, the communication components 964 can include a network interface component or other suitable device to interface with the network 980. In further examples, the communication components 964 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 can be another machine or any of a wide variety of peripheral devices (e.g., a peripheral device coupled via a USB).

Moreover, the communication components 964 can detect identifiers or include components operable to detect identifiers. For example, the communication components 964 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 964, such as location via Internet Protocol (IP) geolocation, location via Wi-Fi® signal triangulation, location via detecting an NFC beacon signal that can indicate a particular location, and so forth.

In various example implementations, one or more portions of the network 980 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 can include a wireless or cellular network and the coupling 982 can be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 can be transmitted or received over the network 980 using a transmission medium via a network interface device (e.g., a network interface component included in the communication components 964) and utilizing any one of a number of well-known transfer protocols (e.g., HTTP). Similarly, the instructions 916 can be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
   a processing device; and
   a memory coupled to the processing device and storing instructions that, when executed by the processing device, cause the system to perform operations comprising:
      identifying one or more evaluation criteria, said identifying one or more evaluation criteria comprising considering one or more domain-specific aspects for determining a valuation;
      collecting historical data with respect to one or more entities, said collecting historical data comprising collecting data related to historical transactions within a particular sector;
      reverse engineering one or more scores of a scoring system with respect to the one or more entities based on the one or more evaluation criteria and the historical data, said reverse engineering comprising reverse engineering the one or more scores based on one or more historical transactions;
      performing a linear regression analysis on the one or more scores to build a predictive model;
      analyzing a new entity using the same scoring system with prescribed parameters;
      using the predictive model, computing a valuation of an entity;
      presenting one or more aspects of the computed valuation within an interactive interface; and
      performing a sensitivity analysis using the predictive model to allow a user to understand valuation implications of investing in various portions of their business by iterating through various scenarios interactively on a real-time basis.

2. The system of claim 1, wherein collecting historical data comprises collecting data related to historical transactions.

3. The system of claim 1, wherein performing a linear regression analysis comprises performing a multiple linear regression analysis on the one or more scores.

4. The system of claim 1, wherein computing a valuation of an entity comprises computing the valuation based on the one or more scores.

5. The system of claim 1, further comprising optimizing one or more investments based on the sensitivity analysis.

6. A method comprising:
- identifying one or more evaluation criteria, said identifying one or more evaluation criteria comprising considering one or more domain-specific aspects for determining a valuation;
- collecting historical data with respect to one or more entities, said collecting historical data comprising collecting data related to historical transactions within a particular sector;
- reverse engineering one or more scores of a scoring system with respect to the one or more entities based on the one or more evaluation criteria and the historical data, said reverse engineering comprising reverse engineering the one or more scores based on one or more historical transactions;
- performing a linear regression analysis on the one or more scores to build a predictive model;
- analyzing a new entity using the same scoring system with prescribed parameters;
- using the predictive model, computing a valuation of an entity;
- presenting one or more aspects of the computed valuation within an interactive interface; and
- performing a sensitivity analysis using the predictive model to allow a user to understand valuation implications of investing in various portions of their business by iterating through various scenarios interactively on a real-time basis.

7. The method of claim 6, wherein collecting historical data comprises collecting data related to historical transactions.

8. The method of claim 6, wherein performing a linear regression analysis comprises performing a multiple linear regression analysis on the one or more scores.

9. The method of claim 6, wherein computing a valuation of an entity comprises computing the valuation based on the one or more scores.

10. The method of claim 6, further comprising optimizing one or more investments based on a sensitivity analysis.

11. A non-transitory computer readable medium having instructions stored thereon that, when executed by a processing device, cause the processing device to perform operations comprising:
- identifying one or more evaluation criteria, said identifying one or more evaluation criteria comprising considering one or more domain-specific aspects for determining a valuation;
- collecting historical data with respect to one or more entities, said collecting historical data comprising collecting data related to historical transactions within a particular sector;
- reverse engineering one or more scores of a scoring system with respect to the one or more entities based on the one or more evaluation criteria and the historical data, said reverse engineering comprising reverse engineering the one or more scores based on one or more historical transactions;
- performing a linear regression analysis on the one or more scores to build a predictive model;
- analyzing a new entity using the same scoring system with prescribed parameters;
- using the predictive model, computing a valuation of an entity;
- presenting one or more aspects of the computed valuation within an interactive interface; and
- performing a sensitivity analysis using the predictive model to allow a user to understand valuation implications of investing in various portions of their business by iterating through various scenarios interactively on a real-time basis.

12. The non-transitory computer readable medium of claim 11, wherein collecting historical data comprises collecting data related to historical transactions.

\* \* \* \* \*